US006801619B1

United States Patent
Bae

(10) Patent No.: US 6,801,619 B1
(45) Date of Patent: Oct. 5, 2004

(54) DEVICE AND SYSTEM TO FACILITATE REMOTE CUSTOMER-SERVICE

(75) Inventor: Sung Bae, Toronto (CA)

(73) Assignee: Helpcaster Technologies Inc., Toronto (CA)

( * ) Notice: Subject to any disclaimer, the term of this patent is extended or adjusted under 35 U.S.C. 154(b) by 347 days.

(21) Appl. No.: 09/671,680

(22) Filed: Sep. 28, 2000

(51) Int. Cl.[7] .............................................. H04M 3/00
(52) U.S. Cl. .................................. 379/266.01; 379/309
(58) Field of Search ........................ 379/265.01, 265.09, 379/265.11, 265.12, 266.01, 266.02, 266.06, 309

(56) References Cited

U.S. PATENT DOCUMENTS

| 5,537,470 | A | * | 7/1996 | Lee ........................ 379/265.11 |
| 6,016,336 | A | | 1/2000 | Hanson .................... 379/88.23 |
| 6,035,190 | A | * | 3/2000 | Cox et al. .................... 455/417 |
| 6,046,762 | A | | 4/2000 | Sonesh et al. ............ 348/14.11 |
| 6,064,730 | A | * | 5/2000 | Ginsberg ............... 379/265.09 |
| 6,081,592 | A | | 6/2000 | Battle ........................ 379/309 |

FOREIGN PATENT DOCUMENTS

| EP | 1035718 A | 9/2000 |
| WO | WO 99 40712 A | 8/1999 |
| WO | WO 99 65214 A | 12/1999 |
| WO | WO 00 35173 A | 6/2000 |

OTHER PUBLICATIONS

Paris G et al: "The Next Generation Call Center" Telcom Report International, Munich, DE, vol. 19, No. 4, 1996, pp. 9–11, XP000618796, the whole document.

* cited by examiner

Primary Examiner—Ahmad F. Matar
Assistant Examiner—Quynh H. Nguyen

(57) ABSTRACT

A device and system for providing customer-service over the Internet via remote browser control, text communication and two-way audio/one-way video link is disclosed. A user at a customer workstation accesses the system through a network, such as the Internet. The user is then identified by a queue manager. The queue manager then queries a customer database to determine which operators previously communicated with the user and the nature of the information previously requested. The queue manager then connects the user with operators with which the user previously communicated with. The user communicates with the operators by sending information by means of text, audio and/or video. Generally, video signals will only be sent one way from the operator to the customer. During the idle time while the user is waiting for an operator, the queue manager sends information to the user in the form of text audio and/or video relating to information which the user previously requested. The call can also be transferred from one operator to another over the data network.

19 Claims, 2 Drawing Sheets

DEVICE AND SYSTEM TO FACILITATE REMOTE CUSTOMER-SERVICE

FIELD OF THE INVENTION

This invention relates to a device, system and process for facilitating remote customer service. More particularly, the present invention relates to a data transfer device to facilitate communication between a plurality of users and a plurality of human customer service representatives using text, audio, video and workspace remote-control mechanisms to improve the human-to-human aspect of the customer service experience.

BACKGROUND OF THE INVENTION

In the competitive market of internet services, from book selling to banking, from furniture selling to tax advice, customer confusion using web-tools is a large source of lost revenue. Customers engaged in online-transactions will often find themselves confused, or in doubt as to the meaning or purpose of part of the process they are following. Customers unable to instantaneously find the answers they need in order to continue will often simply cancel their transaction, or look for services or product elsewhere. In the past, solutions such as one-click shopping, have been proposed to reduce the confusion of filling out forms by simplifying the process. However, in some specific fields, such as tax services, the process by its very nature cannot be simplified. In these fields, searchable online text-help has been proposed. While these systems aid internet-literate customers with common problems, it often alienates novice internet users and trepidatious customers. These customers generally require human help which-may be provided via a multimedia call center.

A call center is a business entity that provides a pool of trained call operators answering telephone queries of a similar nature. Call centers include specialized software to pool the body of knowledge upon which help is offered, and to allow call operators to provide consistent, accurate, helpful information instantly. A multimedia call center is an extension of the above, adding a plurality of access means. Included in a multi-media call center are video-conferencing, so that the call operator and customer can view each other's images. Additionally, multimedia call centers include a remote-control method so that the customer and an operator can collaborate on web-navigation, data-entry, and walk-through various scenarios together. Multimedia adds the foregoing, as well as a process by which to synchronize and queue the various components such that the video, telephone and remote-control network connections are directed to the appropriate call operator simultaneously.

A multimedia call center overcomes some of the customer difficulties mentioned above. For example, U.S. Pat. No. 6,046,762 to Sonesh, for instance, discloses such a multimedia call center. However, despite the obvious advantages of a multimedia call center over previous methods for providing customer help online, there are several disadvantages to the current technology.

One of the disadvantages to the existing technology arises out of the concept of a pool of help operators. Non-multimedia help sessions, where the customer hears the call operator's voice, but does not see the operator, results in a level of impersonal service, such that the customer and operator develop very little rapport. To the customer, the operator is an anonymous agent of the company or service they are calling. As a result, call centers treat the operators in an operator pool as equal resources, and attach no specific benefit to a customer talking to one operator over another. In the multimedia system, where the customer can view the operator, there is a very large element of rapport that comes into play. The customer perception will change, and the customer will think of the operator as an individual. The customer will experience an increased level of comfort and confidence when that rapport has been developed. The customer-operator rapport is potentially one of the key benefits of using video technology in a multimedia call center application.

However, customer-operator rapport takes time to develop. In fact, the customer operator rapport may take more than one call to establish. Furthermore, the customer-operator rapport will be strengthened with each subsequent call for a customer to the same operator. However, this violates one of the basic precepts of existing call queuing systems, namely that all call operators are equivalent. Existing queue management systems cannot take this into account, but rather simply send a customer to one of the operators in the pool each time a customer calls. As a result, there is a need in the prior art for a system and method for the ability of a customer to access the same operator each time they make a call.

A further disadvantage of existing queue management techniques in existing multimedia call center technology is that operator queues are managed in terms of the companies for which help service is being offered, rather than being centered around the customer-operator relationship. As stated above, the rapport developed between an operator and a user is a very powerful means of gaining user trust. Due to the absence of the concept of rapport in existing call center domains, call center queue management has centered on means of pooling help operators around a help database for a particular company. Since in previous models, the operator was anonymous and generic, the central help database—the repository of knowledge used by operators to help users during calls—became the object around which the model was built. Therefore, prior art queue management techniques suffered for the disadvantage that they were focussed around the central help database, rather than the customer.

Another disadvantage of the existing technology is that video conferencing means employed do not take into account optimizations which can be made for one-way conferencing. Multimedia call centers treat multimedia calls as two way communication in the same manner as their precursor telephone calls. However, while the customer and operator must engage in two-way communication, there is very little value added when the operator can see the customer. First, the rapport generated between the customer and operator is intended for the customer's benefit, so seeing the customer does not help the operator. Secondly, the operator must access knowledge-based software and perform remote-control functions to facilitate explanations to the customer, which effectiveness would be lessened by the presence of a video feed from the customer. Thirdly, customer privacy is impinged by the use of a customer to operator video feed. Finally, customers do not tend to own video acquisition devices to supply the video feed. As a result, the desired mechanism for video transfer is one-way-only. Due to this limitation, a number of performance enhancements can be made to the system to take advantage of this condition.

Another disadvantage of the existing technology is that during the customer idle time, as the customer's call has been initiated, and the queue management system is locating and queuing the operator, there is no mechanism to use the captured customer data to help retain the customer during the wait period.

A further disadvantage of the existing technology as it applies to the remote control aspect of multimedia call center systems, is that existing remote-control applications allow the operator access to the entire user desktop. The user's entire computer becomes accessible to the operator, whereas only the portion enclosed in the web-browser has relevance to the help call. Access to the entire desktop represents a security compromise that may cause many would-be-users to avoid the multimedia call center service, on grounds that relinquishing control of the desktop is too great a risk, or a violation of security policy.

A further disadvantage of the existing technology in the domain of remote control, applies to the possibility of intercepted communications between the user and the operator. A scenario exists in the current technology whereby a third-party can intercept and monitor the application under remote-control, thereby violating the privacy of the user. A further scenario exists whereby a malicious third-party may insert control imperatives into the communication channel between user and operator, and cause unwanted activity on the user's and operator's system, thereby compromising the security of both.

SUMMARY OF THE INVENTION

Accordingly, it is an object of this invention to at least partially overcome the disadvantages of the prior art. Also, it is an object of this invention to provide an improved type of device, system and process to facilitate remote customer service by increasing the rapport between a customer service representative and a customer. It is also an object of this invention to provide a device system and process which more efficiently utilizes the idle time during which a customer is waiting for an operator.

Accordingly, in one of its objects, the present invention resides in a multimedia telecommunication system said telecommunication system connecting a customer with one of a plurality of operators, said system comprising: a queue management device for connecting said customers to one of said plurality of operators; a database for storing customer information including an indication of which operators in the pool of operators communicated with specific customers in the past; wherein upon a customer accessing the multimedia telecommunications system, the queue management device determines which operator in the pool of operators the customer communicated with previously and sends a first signal to the customer identifying the previous operator.

In a further aspect, the present invention resides in A process for connecting a customer with one of a plurality of operators, said process comprising the steps of: (a) identifying the customer; (b) determining which operators in the pool of operators the customer communicated with previously; and (c) if the customer previously communicated with a previous operator, connecting the customer with the previous operator.

Accordingly, in one aspect, this invention provides a database which associates previous customers of the service with the operator who provided the service. The database creates an affinity between the customer and any previous operator they may have used, such that, where possible, the customer will be given a choice to wait for the same operator who previously provided service or be connected with a new operator. The queuing mechanism makes use of customer identification and the database to make the association. The queuing mechanism will also give repeat customers to the same operator priority in the queues.

In this way, the present invention facilitates remote customer service, in part, by connecting repeat customers with the previous operator. In this way, rapport will develop between the customer and operator. Furthermore, even if a customer develops a rapport with an operator during one call, this rapport will be strengthened over time if the caller can speak with the same operator in the future. Furthermore, a customer who deals with the same operator over multiple calls will enjoy the benefits of the rapport without having to re-develop a rapport with a different operator for each call. In addition, if the same operator handles subsequent calls for the customer, the operator can use the connection to ask follow-up questions on the results of the previous call, in a manner which will help re-establish rapport very quickly.

A further advantage of the present invention is that the central help data base can be replaced with an operator-user data base which make the operator-user relationship the central concept. The queue management can be refined to select an operator previously used by a user, across a pool of operators for several client companies. In this way, operator-client rapport can be improved thereby facilitating remote customer services.

A further advantage of this invention is to make optimizations for the efficient and effective delivery of two-way audio/one-way video stream from the operator to the customer. The optimizations shall add realism to the portrayal of the operator via the audio/video medium. Furthermore, the user sees visual symbols identifying the status of the link, so that any missed frames, or delayed video frames will not be mistaken for operator inactivity.

Still a further advantage of this invention is to provide a queue management mechanism which allows the company or individual offering the service to customize the audio/video information displayed while the user waits for the operator. In part, this is arranged by the queue management system associating the customer identification with other aspects of customer service. For example, in a company scenario, a customer waiting for help with an income-tax form from a tax consulting firm, may see audio/video advertising the consulting firm's other services. In the case of an individual, such as a customer waiting to connect to an operator running an auction at a web-auction site, the customer may see information about the operators other auctions at that site. The contents of the audio/video stream encountered during the wait for operator period may be varied according to other customer information, such as income level, or other non-customer associated data, such as time of day, day of year, etc.

A further advantage of the present invention is that if the customer selects to wait for service, the established video feed to the customer can be used to provide the customer with topics, advice, or advertising, in full-video, relating to the service or system they are requesting help on, and relating to further environmental conditions, such as time of day, or local weather. The topics can also be queued to correspond to services that the customer may be interested in based on previous information collected on the customer. Furthermore, in addition to one-way video feeds, the link can be used for interactive customer activity, including, customer identification, completion of customer surveys, customer feedback on service, and other customer-driven activities.

It is a further object of this invention to provide a means for the operator and user to view the same browser information, without opening up the user's entire desktop or computer to the operator. This type of device and system provides a large security advantage over existing systems. The device and system allows the operator to have control and access only to a viewable portion of the user's web browser program or device. The activities of the user outside of the browser viewable area would not be known to the operator. Similarly, the operator will have no ability to influence the customer's desktop or computer or device, apart from the visible area of the browser.

It is a further object of this invention to allow the customer to continue work unimpeded once the call request has been queued. That is, once the customer has chosen to wait for an operator, and has been informed of the expected queue time, the customer can continue to use the browser to go on to other activities. When the operator is available, the queuing system will provide the operator means to navigate the user's browser back to the point where the call is made. This mechanism allows to user to spend the idle time in productive or leisurely activities at the customers discretion. The customer's satisfaction is heightened by not being forced to wait idly, as with existing multi-media call center technology.

It is a further object of this invention to allow customers equipped with standard browsers to enjoy access to the service without the need for software installation. Existing technology relies on video transmission and remote-control software that forces the user to install the software on their system before making use of the service. For most customers, the installation step is a large detraction at least because it asks the customer to execute potentially untrusted software on their computer, it asks the customer to configure and setup a software application, it often forces the customer to restart their computer, and it delays the customer's access to the service. For many potential customers, the installation step is not possible because, they either do not have permission to install software for corporate security reasons, or they use a non-standard operating system, such as a UNIX derivative or MacOS. By contrast, the present invention uses the java runtime component of a standard browser to provide the remote-control, the audio/video, the two-way text, and all other aspects of the client-side requirements to allow the customer to use the service without installing software.

Further aspects of the invention will become apparent upon reading the following detailed description and drawings which illustrate the invention and preferred embodiments of the invention.

DETAILED DESCRIPTION OF THE PREFERRED EMBODIMENTS

Figure 1:
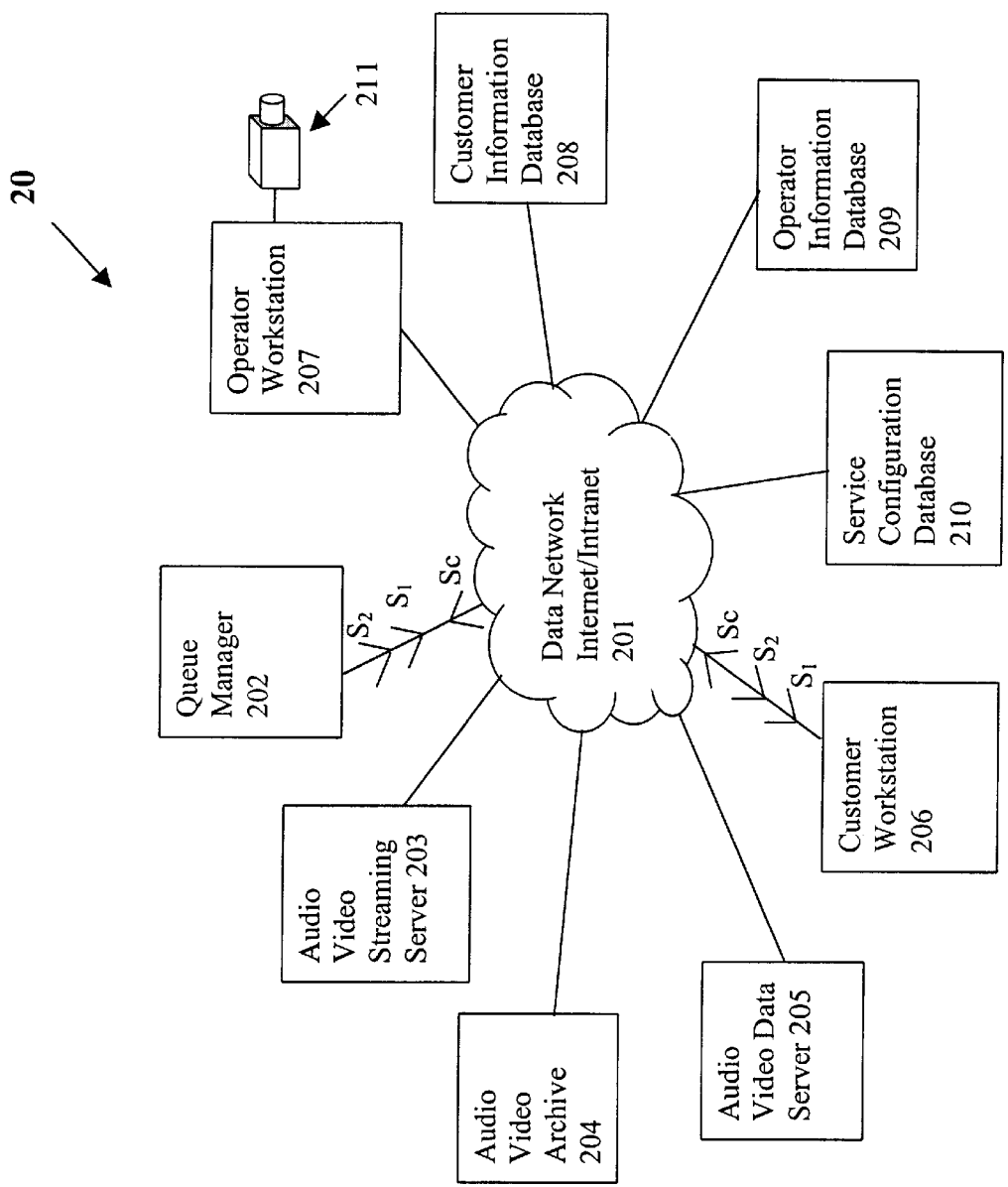
FIG. 1 shows a schematic drawing of a system comprising a queue management device according to one embodiment of the present invention.

FIG. 1 illustrates a system, shown generally by reference numeral 20, according to one embodiment of the present invention. The system 20 manages customers or users seeking information from representatives of firms or companies.

A customer or user can access the system 20 by using a customer workstation, shown generally by reference numeral 206. The customer workstation 206 can comprise a generic workstation, which is connectable to a data network 201.

Likewise, the representatives for the firms or companies, which will be referred to as operators, will also have workstations, illustrated in FIG. 1 as operator workstations 207. The operator workstations 207 can comprise a generic workstation, which is connectable to a data network 201. In general, there will be a plurality of workstations 207, namely one operator workstation 207 for each operator that can be active at a given time.

The data network 201, maybe the Internet, an intranet, a combination of the two, or another network topology. The customer workstation 206 and operator workstations 207 will comprise tools for accessing the network 201. For example, in the case where the workstations 206, 207 is the Internet, the network 201 will comprise an Internet browser.

Upon the customer accessing the system 20 to request information representatives of the firm or companies, the customer will be forwarded to a queue manager 202 for processing. The initial task of the queue manager 202 will be to identify the customer. This can be done in a number of ways, as is known in the art. For example, a customer can be identified through standard methods, such as the use of browser cookies. Furthermore, this system may comprise an account and password authentication system. Another method of identifying the customer which may be used is a customer survey as provided via the java runtime components.

Once the customer has been identified, the queue manager 202 then gathers data for determining the operator base from which to service the customer. In particular, the queue manager 202 will consult customer information databases 208, to find previous access information about the customer, such as, but not limited to, previous topics covered, operators who provided service in the past, average call length and prepaid service levels. The database 208 may also comprise other customer provided data such as income level, gender, and other personal information.

The queue manager 202 will also consult the operator information database 209, to determine operators qualified to deliver service, and operators currently registered as available to deliver service. In addition, the queue management system will consult service configuration database 210 to determine what type of service is being sought, what operators are available to provide the service, any special customer data that must be collected prior to establishing service, (for example prior registration for the service or a serial number for a purchased product), and other service information such as availability by time of day, day of week, or other factors.

In order to increase the rapport between customers and operators, the queue manager 202 will give preference to operators which the customer communicated with previously. In other words, when the queue manager 202 consults the customer information database 208, the queue manager 202 will also become aware of whether or not the customer has previously accessed the system 20, and if so, the operator who communicated with this customer in the past. The queue manager 202 will then select the operator which the customer communicated with previously as the operator to whom the customer will be connected with at present.

Assuming the operator which the customer communicated with previously is active, meaning that the operator is available, the queue manager 202 will send a first signal $S_1$ to the customer workstation 206 identifying the previous operator. In the preferred embodiment, the customer will now be given the opportunity to accept or reject the previous operator.

The customer may accept or reject previous operators by generating a customer signal Sc at the customer workstation 206 either accepting or rejecting the previous operator. Clearly, if the customer did not have a favourable experience with the previous operator in the past, the customer will be free to send a customer signal Sc which rejects the previous operator. The queue manager 202 will then select an alternate operator. If, however, the customer had a favourable experience with the previous operator, the customer can send a customer signal Sc which accepts the previous operator. The queue manager 202 will then connect the customer with the previous operator. In this way, the rapport between the customer and previous operator can be further strengthened. Furthermore, if the customer's question relates to an issue with which the customer communicated with the previous operator, the previous operator may recall the communication, thereby permitting the customer to dispense with a great deal of background discussion.

In the preferred embodiment, the first signal $S_1$ identifying the previous operator will also comprise an estimate of the idle time the customer will be required to wait until the previous operator is available. In this way, even if the customer had a favourable experience with the previous operator, if the idle time is too great for the customer, the customer may send a customer signal Sc rejecting the previous operator in favour of an operator who would be available more quickly. If the customer generates a customer signal Sc rejecting the previous operator, then the queue manager 202 will select an alternate operator.

Whenever the customer sends a customer signal Sc rejecting an operator, the queue manager 202 will select an alternate operator by determining which operator, other than the previous operator, the customer communicated with previously. The queue manager 202 will then generate and send a second signal $S_2$ to the customer identifying the alternate operator.

The queue manager 202 may select the previous operator, as well as the alternate operator, in a number of ways. For example, if the customer has accessed the system 20 several times in the past, the queue manager 202 may rank the operators which the customer communicated with in the past. The operators may be ranked by the queue manager 202 determining which operator the customer has communicated with the most number of times in the past. In this way, the previous operator will be the operator which has communicated with the customer the most number of times. The alternate operator, and other operators, will then be ranked by the number of times that they have communicated with the customer. The alternate operators will then be selected and proposed to the customer based on their ranking.

In another embodiment, the queue manager 202 may determine the previous operator by determining which operator the customer communicated with immediately previously, regardless of the number of times the customer communicated with that operator. In this embodiment, the likelihood that the previous operator has background knowledge of the matter the customer is presently seeking information on would be much greater because the customer may have a follow up question relating to the same matter. Similarly, the alternate operator, and other operators, would then be ranked not by the number of times they communicated with the customer, but rather the length of time since the customer communicated with the operator in the past.

It is apparent to persons skilled in the art that other manners of ranking the operators in order to determine the previous operator and alternate operators are also possible. However, it has been found that ranking the operators by the number of times they have communicated with the customer, and, the time that has passed since the customer communicated with the operator, are the most efficient and provide the best rapport between the customer and operator. Furthermore, the method of ranking the operators can be configured and changed by an administrator in real time to meet specific requirements.

Until such time as the connection between the operator and customer has been made, which time period is often referred to as idle time, the queue manager 202 provides information to the customer. The information provided to the customer can be information in the nature of general interest information such as news, weather, etc., to keep the customer interested during the idle time. In a preferred embodiment, however, the information provided to the customer during the idle time will be related to the information previously requested by the customer. In this embodiment, the queue manager 202 will determine from the database 208 what information the customer previously requested.

Since the queue manager 202 has access to all aspects of the customer data, service data, and operator data through the customer database, the customization of the video/audio stream can be determined on a very fine granularity. The queue manager 202 will then provide to the customer during the idle time information relating to information the customer previously requested. The queue manager 202 can accomplish this in one embodiment by selecting and providing audio/video streaming of information, advertising, or programming relating to information the customer previously requested.

Sources for audio/video data include audio/video data servers 205 which provide streaming data in conjunction with an archive 204, where the data is stored. The audio/video data services 205 provide audio/visual data based on the signals provided by queue manager 202. An example of archive data might be a set of videos advertising an operator/service provider's auctions at an auction site (in this example the service being asked is relevant to online auctions). Another potential source of data is an online audio/video stream from the audio/video stream streaming server, the audio/video archive 204 and the audio/video data server 205, such as a news program or advertising stream. In one embodiment, the information may be provided in exchange for revenue.

As stated above, it is understood that the data network 201 may be any type of network having any type of topology. In particular, while in FIG. 1, the data network 201 is shown as being a single network between each of the elements 202 to 210, it is understood that the data network 201 may actually comprise several different networks.

For example, the customer at the workstation 206 may connect to the system 20 through the Internet. The system 20 may then have an intranet to which the queue manager 202, the operator workstations 207, the customer information database 208, the operator information database 209 and the service configuration database 210 are connected. In a similar manner, the audio/video streaming server 203, the audio/video archive 204 and the audio/video data server 205 may also be connected to the same intranet as the queue manager 202. Alternatively, if the queue manager 202 is being provided by a contract or service, the queue manager 202, the customer information database 208, the operator information database 209 and the service configuration database 210 may be a separate intranet located at the service provider, while the audio/video streaming server 203, the audio/video archive 204 and the audio/video data server 205 may be connected to a separate intranet located remotely from the queue manager 202 and proximate the firm or company to whom the queue manager 202 is providing the service.

Likewise, the operator workstations 207 may form part of the firm or company, and may be connected by the Internet to the audio/video streaming server 203, the audio/video archive 204 and audio/video server 205, or may be part of the service provided by the queue manager 202. In the further alternative, the operator workstations 207 may be part of a separate entity or firm providing operators on a contract basis to the queue manager 202 and/or the firm or company in which case the operator workstations 207 may be located remotely from all other elements in the system.

It is also understood that the data network 201 can provide any type of information. For instance, the information may comprise data in the form of text, audio signals and/or video signals. It is also understood that the nature of the information being provided will be dependent upon the tools present at the customer workstations 206, as well as the operator workstations 207. For instance, if the customer workstations 206 do not have tools to facilitate audio and/or video transmission, the information will be provided in text only. However, it is understood that the nature of the communication between the customer and the operator will be any type of information which can facilitate the remote customer service, and, increase or improve the human-to-human aspect and rapport of the customer service experience.

Regardless, of the type of data network 201, it is understood that the data network will preferably have strong encryption such that any signals and/or data transmitted from the customer workstation 206 to the system 20, including the queue manager 202 and the operator workstation 207, and will be protected from unauthorized interception by third parties. Likewise, communication between the queue manager 202 and other elements of the system 20, such as the customer database 208, the operator information database 209 and the service configuration database 210, may also be encrypted to the extent the communication takes place on a non-restricted access network, such as the Internet.

In a preferred embodiment, the operator workstations 207 will comprise a video unit 211. The video unit 211 will capture video images from the operator at the operator workstation 207. The video images can then transmitted to the customer workstation 206 for viewing by the customer. It has been found that video images in the reverse direction, namely from the customer to the operator, are not as important. Therefore, video transmission from the customer workstation 206 to the operator will generally not be provided. This is the case because rapport with the customer at the customer workstation 206 is generally facilitated by the customer viewing the operator, rather than the operator viewing the customer. Furthermore, customer workstations 206 may not have a customer video unit (not shown) to facilitate capturing and sending video images from the customer to the operator workstation 207. Furthermore, the operator at the operator workstation 207 may have several images being displayed on their workstation, including data information on the customer, such that space on the operator's display to view the customer may not be worthwhile.

Once the customer accepts an operator and the operator becomes available, the queue manager 202 will connect the customer with the operator by connecting the customer's workstation 206 with the operator's workstation 207. The customer and the operator can then communicate to assist the customer with the customer's queries and/or orders. At the conclusion of the communication, the customer may simply disconnect from the network 201 and the operator workstation 207, thereby ending the communication.

However, if the customer has further questions regarding a topic the operator is unfamiliar with, the operator transfers the customer back to the queue manager 202 with an indication of the nature of the customer's further queries. The queue manager 202 will then place the customer in a new queue for an operator or subset of operators which can assist the customer with the further subject matter. At this time, the queue manager 202 may also determine from the database if the customer previously communicated with an operator regarding the further topic and, if so, connect the customer with this previous operator.

Figure 2:
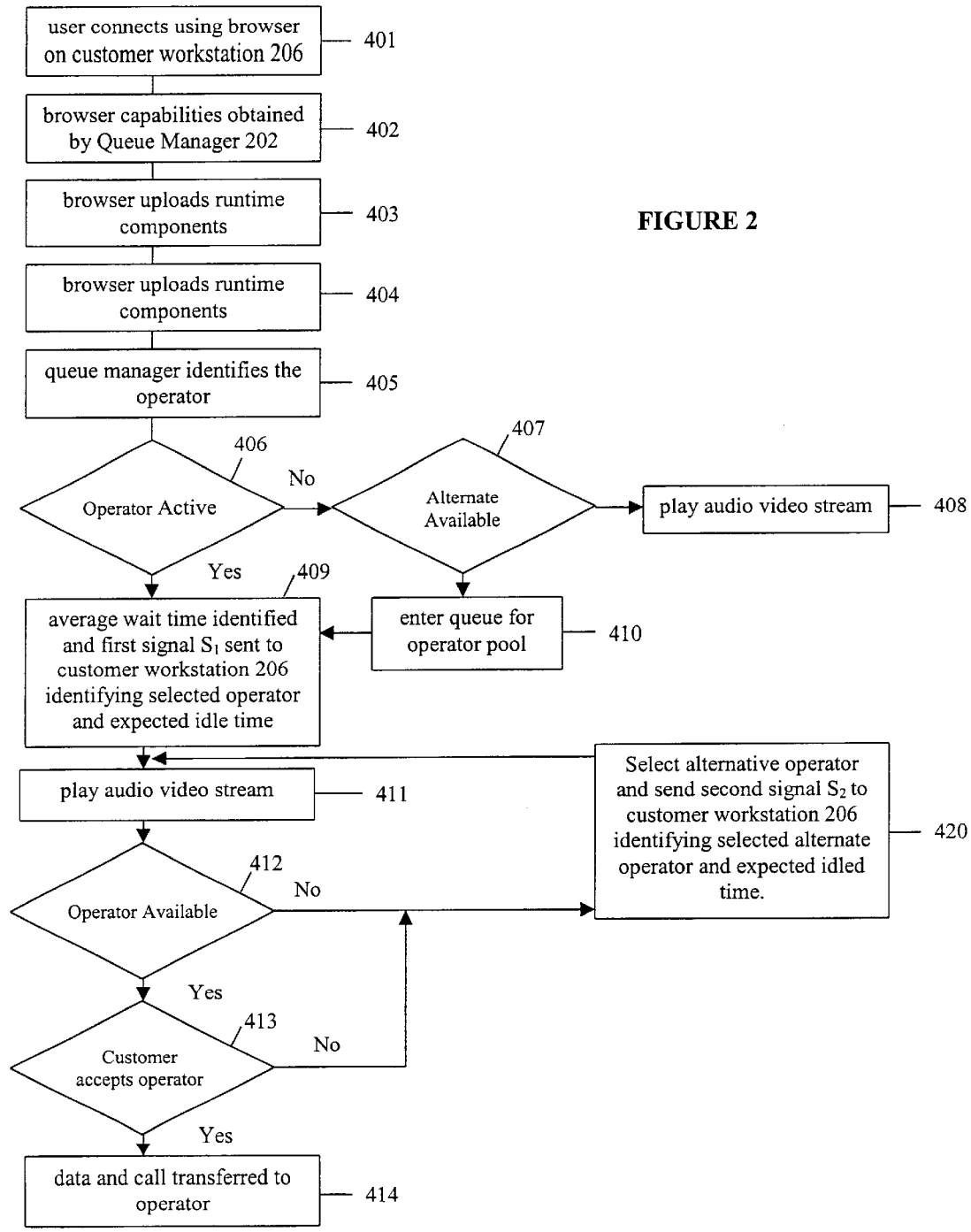
FIG. 2 shows a flowchart drawing of a queue management method according to one embodiment of the present invention.

FIG. 2 shows a flow chart 400 illustrating a queue management process according to one embodiment of the invention. As illustrated in FIG. 2, in the initial step 410, a user connects to the system 20 using a standard browser. At step 402 the queue manager 202 then determines the capabilities of the customer workstation 206. For example, where the customer workstation 206 uses a web browser to connect through the Internet, the queue manager 202 uses standard HTTP protocol connection handshaking to determine the browser capabilities of the user's workstation 206. The queue manager 202 then selects the java runtime components best suited to the browser that the customer's workstation 206 is using to provide delivery of two-way audio/one-way video, two-way text, as well as remote control capabilities of the user workstation. These runtime components are uploaded to the browser of the user's workstation 206 as java classes at step 403.

The queue manager 202 identifies the customer at step 404. Methods to identify the customer include standard methods described above, such as use of browser cookies, account and password authentication, and customer survey as provided via the java runtime components. In some cases, the provider of the system 20 may wish to allow anonymous access to the system 20, in which case, user information is not collected, and the user is not identified.

The queue manager 202 then identifies the appropriate operator or operator queue for the service being requested at step 405. In the case where the service is managed or supported by a single operator, such as in the case of an online auction where the seller is an individual, then the queue is limited to a single operator.

In the case where the customer data is available, and the customer has previously used the system, then the queue is limited to the operators most recently used by the customer. The exact meaning of "recent" is configurable, and may depend on the type of service requested in the past and at present by the customer, the customer preference, customer priority, and other factors. In the case that a pool of operators is selected, whether two or more, control flows to step 410.

If a single operator is selected, flow continues to step 406. If the operator desired is currently active, which means that the operator is servicing calls, and has registered with the queue manager 202 as active, then control flows to step 409. In the event that the operator is not active, for example, they are at lunch, and disconnected from the queue manager 202, then the queue manager 202 looks for an alternate operator, or pool of operators shown by step 407. This would occur, for example, if a second-time customer was using a service, and the original operator was not available. If no alternate is available, the queue manager 202 finds an appropriate video stream to queue to the user (see step 408). In the event the operator becomes active while customers are receiving streaming audio/video at step 408, all such customers will enter a priority-sequence queue for service from the operator, and move to step 409.

Once the customer has entered either a queue for a pool of operators, or a queue for a single operator, the single operator or pool of operators as well as the average wait or idle time will be identified to the customer at step 409 by the queue manager 202 generating and sending the first signal $S_1$ to the customer workstation 206. The wait or idle time is determined based on a number of factors, including average call length, pool factors such as number of operators in the pool, customer factors, such as priority, service level purchased, or position in the queue, and environmental factors, such as time of day, day of week.

The queue manager 202 also selects and queues appropriate audio/video material for the wait period at step 411. The audio/video material may emanate from a number of sources, including the audio/video streaming server 203, the audio/video archive 204 and the audio/video data server 205. Preferably, as described above, the audio/video material will relate to information previously requested by the customer, as described above.

At regular intervals, or by customer initiated query, the system will check to see if an operator is available at step 412. At this time, a new first signal $S_1$ may be sent showing the revised estimate idle time.

If, at any time, the customer sends a customer signal Sc reflecting the operator or pool of operators, the queue manager 202 will select an alternate operator at step 420. A second signal $S_2$ will then be sent from the queue manager 202 to the customer workstation 206 identifying the alternate operator and the estimated idle time for the alternate operator.

If during the wait, whether for a single operator, or pool of operators, an operator becomes available, control flows to step 413. The operator information is presented to the customer for approval. In the event that the customer was waiting for a specific operator, and not a pool, the customer assent is assumed, and control flows to step 414.

If the customer was waiting for a specific operator, and another operator became available able to provide the service, and the customer was next in priority-sequence, the queue manager 202 may propose the alternate operator to the customer. The customer will be presented with summary information about the operator, and provided they choose so in a timely manner, will be serviced by that operator. If the customer declines, or does not respond, they will resume waiting for the specific operator or a pool of operators.

It is understood that although workstations 207 have been referred to as "operator" workstations 207, these workstations are not limited to "operators". Rather, any representative of a firm or company, including employees and executives, may have an operator workstation 207 for answering requests from customers. In other words, the operator workstations are not limited to help desks or call centers, but rather can be used by any representative of a firm or company.

It is also understood that the customer workstations 206 may be any type of device which an connect a user to the system 20 through a data network 201. In particular, the customer workstations 206 may be a personal computer executing a web browser, as well as wireless devices communicating data through a network, a computing device located at a kiosk, an automated teller machine, or a computer connected to another device, such as an appliance or an automobile. It is also understood that the data and signals will have a format appropriate to the device. For example, in the case of a personal computer, the web browser may send and receive data and signals using hyper text transfer protocol (http).

It will be understood that, although various features of the invention have been described with respect to one or another of the embodiments of the invention, the various features and embodiments of the invention may be combined or used in conjunction with other features and embodiments of the invention as described and illustrated herein.

Although this disclosure has described and illustrated certain preferred embodiments of the invention, it is to be understood that the invention is not restricted to these particular embodiments. Rather, the invention includes all embodiments which are functional, electrical or mechanical equivalents of the specific embodiments and features that have been described and illustrated herein.

The embodiments of the invention in which an exclusive property or privilege is claimed are defined as follows:

1. A multimedia telecommunication system said telecommunication system connecting a customer with one of a plurality of operators, said system comprising:

a queue management device for connecting said customers to one of said plurality of operators;

a database for storing customer information including an indication of which operators in the pool of operators communicated with specific customers in the past;

wherein upon a customer accessing the multi-media telecommunications system, the queue management device determines which operator in the pool of operators the customer communicated with previously and sends a first signal to the customer identifying the previous operator; and wherein if the customer has previously communicated with more than one operator, the queue management device determines the previous operator by determining which operator the customer has communicated with the most number of times.

2. The system as defined in claim 1 wherein the first signal also comprises an estimate of idle time the customer will be required to wait until the previous operator is available.

3. The system as defined in claim 1 wherein the queue management device gives the customer an opportunity to accept or reject the previous operator; and wherein when the customer rejects the previous operator, the queue management device will select an alternate operator for the customer.

4. The system as defined in claim 3 wherein the queue management device selects an alternate operator by determining which operators, other than the previous operator, the customer communicated with previously and the queue management device sends a second signal to the customer identifying the alternate operator.

5. The system as defined in claim 1 wherein if the customer has previously communicated with more than one operator, and the operator the customer has communicated with the most number of times is not available, the queue management device determines the previous operator by determining which operator the customer communicated with immediately previously.

6. The system as defined in claim 2 wherein the database includes an indication of information the customer previously requested; and wherein during the idle time, the queue management device forwards to the customer information related to the information the customer previously requested.

7. The system as defined in claim 1, further comprising communication devices for facilitating communication between operators and the customer.

8. The system as defined in claim 7 wherein the communication devices include a video camera located at an operator workstation permitting video data to be sent from the operator to the customer.

9. The system as defined in claim 1 wherein the queue management device determines within the pool of operators a sub-pool of operators which the customer communicated with previously and sends a first signal to the customer identifying the sub-pool of operators; and wherein the customer will be placed in a queue to communicate with an operator in the sub-pool of operators.

10. A process for connecting a customer with one of a plurality of operators, said process comprising the steps of:

(a) identifying the customer;

(b) determining which operators in the pool of operators the customer communicated with previously; and (c) if the customer previously communicated with a previous operators, connecting the customer with the previous operator and, if the customer has previously communicated with more than one operator, determining the previous operator by determining which operator the customer has communicated with the most number of times.

11. The process as defined in claim 10 further comprising the steps of:

(d) generating a first signal identifying the previous operator and an estimate of idle time the customer will be required to wait until the previous operator is available;

(e) sending the first signal to the customer, and (f) giving the customer an opportunity to accept or reject the previous operator.

12. A process as defined in claim 11 further comprising the step of:

(g) if the customer rejects the previous operator, selecting an alternate operator for the customer.

13. The process as defined in claim 12 wherein step (g) of selecting an alternate operator comprises the sub-steps of:

(g1) determining which operators, other than the previous operator, the customer communicated with previously and selecting the alternate operator from other operators the customer communicated with previously;

(g2) generating a second signal identifying the alternate operator and an estimate of idle time the customer will be required to wait until the alternate operator is available; and (g3) giving the customer an opportunity to accept or reject the alternate operator.

14. The process as defined in claim 10 wherein the step (b) of determining which operators in the pool of operators the customer communicated with previously comprises the sub-step of:

(b1) if the customer has previously communicated with more than one operator, and the operator the customer has communicated with the most number of times is not available, determining the previous operator by determining which operator the customer communicated with immediately previously.

15. The process as defined in claim 10 wherein step (c) of connecting the customer with the previous operator if the customer previously communicated with an operator comprises the sub-steps of:

(c1) if the customer previously communicated with more than one operator, determining within the pool of operators a sub-pool of operators which the customer communicated with previously; and (c2) placing the customer in a queue to communicate with an operator in the sub-pool of operators.

16. The process as defined in claim 11 further comprising the steps of:

(h) if the customer previously communicated with an operator, determining what information the customer previously requested;

(i) during the idle time, forwarding information regarding the previous information to the customer.

17. The process defined in claim 10 wherein the customer communicates with the operator in a format including at least one of two-way text data, two-way audio data and one-way video data from the operator to the customer.

18. The system as defined in claim 1 wherein the queue management device gives the customer an opportunity to accept or reject the previous operator; and wherein when the customer accepts the previous operator, the queue management device connects a workstation operated by the customer with a workstation operated by the previous operator.

19. The system as defined in claim 18 wherein once the customer has concluded communicating with the previous operator, the previous operator can return the customer to the queue manager for connection to another operator.

* * * * *